United States Patent [19]

Roschier

[11] Patent Number: 4,679,032

[45] Date of Patent: Jul. 7, 1987

[54] PROCEDURE AND MEANS FOR PRODUCING A CONTRAST IMAGE

[75] Inventor: Nils-Robert Roschier, Vantaa, Finland

[73] Assignee: Elevator GmbH, Baar, Switzerland

[21] Appl. No.: 679,032

[22] Filed: Dec. 5, 1984

[30] Foreign Application Priority Data

Dec. 14, 1983 [FI] Finland ................................. 834600

[51] Int. Cl.$^4$ .............................................. G08B 13/26
[52] U.S. Cl. ................................... 340/562; 307/116; 340/550; 381/1; 381/54
[58] Field of Search ............... 340/550, 552, 561, 562; 382/1, 54; 307/116, 125; 49/31, 25, 28; 324/77 B, 77 E

[56] References Cited

U.S. PATENT DOCUMENTS

| 3,805,061 | 4/1974 | De Mijsiny et al. | 340/552 |
| 3,973,208 | 8/1976 | Diamond | 340/562 |
| 4,295,132 | 10/1981 | Burney et al. | 340/562 |
| 4,326,197 | 4/1982 | Evin | 340/552 |
| 4,339,711 | 7/1982 | Inami et al. | 324/77 B |
| 4,506,765 | 3/1985 | Payne et al. | 340/19 R |

Primary Examiner—Leo H. Boudreau
Assistant Examiner—Jose L. Couso
Attorney, Agent, or Firm—Browdy and Neimark

[57] ABSTRACT

A procedure and an apparatus for producing an image based on contrast discrimination in an image forming apparatus with one-dimensional or multidimensional image field. For accomplishing a novel image forming system, specifically employable in small format image forming applications, the image signals obtained from the image forming points produce an electric current in the image forming channel connected to each image forming point, this current exerting an influence on the current passing from the tapping point of the image forming channel to said channel, and on the voltage produced at said tapping point, in the way that their product is proportional to the image signal current, and wherein the output of image forming is a frequency which is proportional to the current, and wherein the desired contrast heightening is achieved by supplying externally a suitable current to an interaction network connecting the tapping points of one or more image forming channels by suitably selected impedances, and wherein the frequencies obtained from each image forming channel constitute the starting point for the image forming cycle.

16 Claims, 17 Drawing Figures

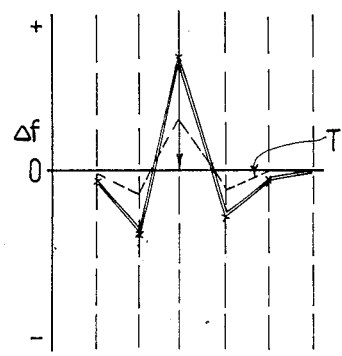
Fig 7a
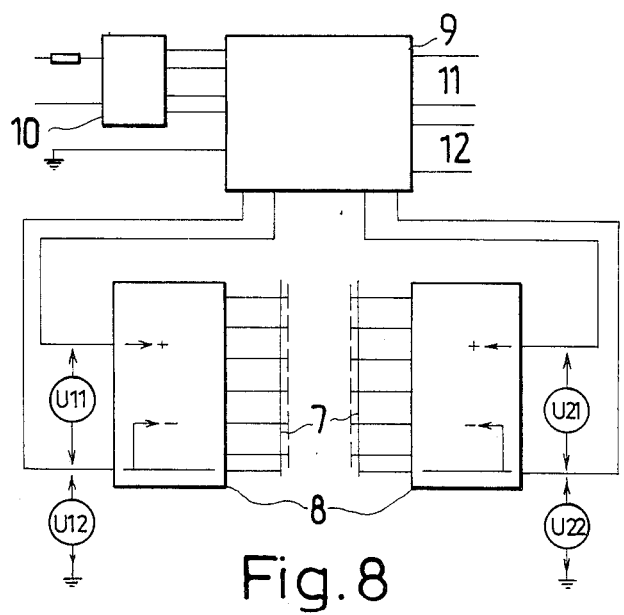
Fig. 8
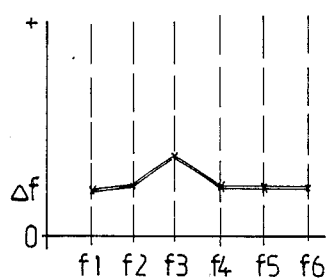
Fig. 7b
Fig. 10
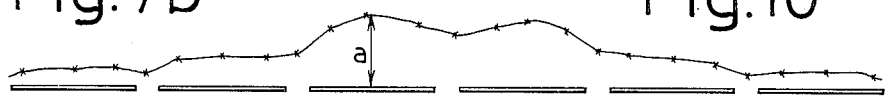
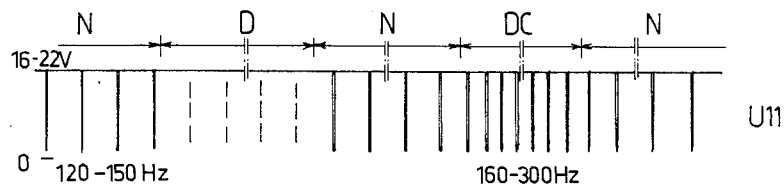
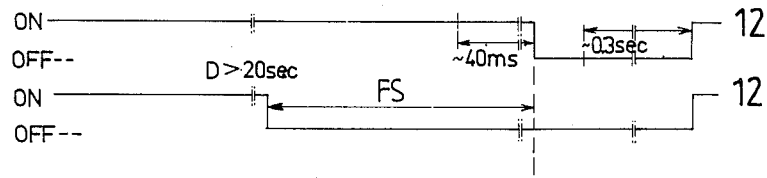
Fig. 11

PROCEDURE AND MEANS FOR PRODUCING A CONTRAST IMAGE

BACKGROUND OF THE INVENTION

The present invention concerns a procedure and a means for producing an image based on contrast discrimination in an image forming means with one-dimensional or multidimensional image field.

A plurality of industrial products and functions would be easy to automate and their efficiency could be increased if a simple image forming means serving as a visual or tactile sense were available for diverse control and monitoring functions. Activities of this kind would be, for instance, optimizing the operation of lift doors or location finding among the shelf beams in a warehouse system in automated material handling.

Among the image forming means in current use, the means working with a great number of image elements are not sensible to be used in small format controlling and monitoring tasks. For instance, coding a colour TV image in real time requires approximately 85 Mbit/sec handling rate, whereas the clock frequency of a fairly fast 8- bit microprocessor is no more than 6–8 MHz. The design of the present invention is intended for small format systems with a relatively small number of image points, and it is concentrated on pre-processing the image information, which in this case can be carried out largely independent of the application objects.

Small format monitoring systems which do not use a camera or equivalent means are as a rule built around a small number of independently operating on/off sensors. The most common sensor types are the photocell, supersonic pick-ups and inductive and capacitive pick-ups. Said pick-ups have been developed to be more accurate and less expensive, whereby it has been possible to increase their number in various applications, but in those applications said sensors still operate as individuals, each with its own operating point setting. A design differing in the synchronizing of different points of measurement has been disclosed, for instance, in the European Patent Application No. 17 547, which reads on a proximity detector with six image forming points. In this design, the signals from capacitive antennas have been processed in combination, whereby an adequate change of capacitance at any one antenna produces a distinguishable change with reference to the mean change of all antennas.

The advantage of the above design in comparison with onepoint sensor applications and differentially operating twopoint sensor applications is its more extensive range of coverage. Since the outputs of the antennas are merely compared with their mean, this cannot yet be considered to represent any versatile image forming. Drawbacks of the design according to the European Pat. No. 17 547 are furthermore its high sensitivity to background capacitances in the environment, which particularly in lift applications changes from floor to floor, and poor control in special situations, for instance particularly when the lift doors are close to their extreme positions. For instance, regarding the sensitivity of the edge sensors on a lift door compromises are frequently unavoidable owing to environmental conditions, since otherwise an unreliable, over-sensitive means would be the result.

An image composed of as few as six points contains much more information than a mere deviation of mean. Means handling typically greater numbers of image points, such as photodiode arrays, have been so constructed that all image forming points have as nearly as possible the same gain. If it is desired to compose an image based on a plurality of inexpensive sensors, e.g. phototransistors, the variation of gains and soiling and other environmental factors impede any attempt at stable synchronization of the image forming points. Individual calibration of the amplifiers cannot be considered any satisfactory solution in such cases, even though a microcomputer for instance can automatically attend to this.

OBJECT OF THE INVENTION

The object of the present invention is to provide an image forming procedure and means for small format viewing applications and in which the drawbacks mentioned have been eliminated or decisively reduced, and the implementation of which is simple, insensitive to variations of conditions and to disturbances and, moreover, inexpensive. For accomplishing this effect, the procedure of the invention is mainly characterized in that the image signals obtained from the image forming points produce an electric current in an image forming channel connected to each image forming point, said current influencing the current passing into the channel at the tapping point of the image forming channel, and the voltage formed at said tapping point, in such manner that their product is proportional to the image signal current, and wherein the output of image forming is a frequency which is proportional to the current, and wherein desired contrast heightening is achieved by supplying from the outside an appropriate current into an interaction network connecting the tapping points of one or several image forming channels by suitably selected impedances, and that the frequencies obtained from each image forming channel constitute the starting point for the image processing phase.

The advantages of a procedure of this kind include the fact that thanks to the interaction network, the currents caused by the image forming points "leak" to those points where the current is higher than normal owing to an object that has entered in front of the background of the image field. This feature is the basis for contrast discrimination, because the differences between image forming channels are heightened and the sensitivity improves.

Based on frequency, it is easy to transform the image into digital form, e.g. by counting the number of pulses over a constant period of time. The contrast image defined by the frequency components can be after-processed in a way appropriate in each particular application. Another significant advantage is then that the image signals can be modified in real time in parallel by simple tools, directly into digital form.

An advantageous embodiment of the procedure of the invention is characterized in that by means of series-connected resistor-capacitor impedances in the interaction network is produced a frequency component which is proportional to the angular changes of the intensity image formed by the original image signals, and which in the course of a time determined by the changes adapts the permanent changes of the viewed object, contributing to the production of a smooth image.

An advantageous embodiment of the procedure of the invention is also characterized in that to the tapping points of the image forming channels is connected a resistance of which one end is connected to a suitably selected voltage level, by which is produced a frequency component proportional to the absolute value of the image signals.

Adaptivity is generally understood to mean that the reaction of a certain member to a disturbance diminishes until the reaction has entirely ceased to exist although the disturbance is still present. Features of this kind have been built into various controlling means even before. They have been encumbered by the drawback that even major disturbances, such as a person, become adapted out of the monitor image although the cause of disturbance is still present and should be taken into account. The procedure of the invention operates in three different ways in a case like this: by adaptation of a component proportional to the second derivate, that is, to the changes in slope of a curve formed of the intensity signals from the image forming points; by creating and maintaining a component proportional to the absolute values while the disturbance is present; by an "after-image effect" of the adaptation when the disturbance disappears, thereby producing a "negative" image in the adapted smooth background image. Said different modes of operation afford a chance to design intelligent monitoring means applications.

The fact that the first frequency image component, which in normal situations is the decisive factor, is proportional only to the second derivate of the object of image forming implies that indication of disturbance will not occur for changes taking place all over the image field, not even if their magnitude were to change linearly across the image field: the disturbance indication only observes discontinuous, local changes. In this manner, any irrelevant changes in the environment are filtered out of the image forming.

An advantageous embodiment of the procedure of the invention in the field of lift technology is characterized in that the capacitive image forming system based on contrast discrimination is employed in one-dimensional form on the lift's safety edge in the way that at least on one side of the lift door opening are provided image forming points in a vertical line to monitor the entrance of people and things in the opening of the lift door, and that when the image forming system concludes that an obstacle has entered between the lift doors it transmits information to this effect to the control system of the lift.

The term "safety edge" has its origin in the mechanical safety means on lift doors which consist of spring-loaded strips countersunk in the door edges and which on hitting an obstacle act on the limit switches controlling the operation of the lift door. The observation can be made, referring to the above-mentioned characteristics of the invention, that the safety edge of the invention has adequate sensitivity in all circumstances by the aid of the filtering out of environment variables and by adaptation, in addition to which it presents good stability, thanks to its simple construction.

A lift embodiment of the procedure of the invention is also characterized in that the image forming means monitors the operation of the lift doors independently by observing the absolute values of the capacitances seen by the antennas in the door openings, and the duration of obstacle indication, whereby the safety edge is made inactive while the doors are closed, in which case the capacitance is clearly higher than while the doors are open, or when the sum of the durations of obstacle indications exceeds a predetermined limit.

Thanks to the operation that has been described, the degree of availability of the lift is maximally independent of safety edge failures because the safety edge is permanently made inactive by internal monitoring, and substitutes for instance a photocell to serve as safety means in nearly all instances of defect.

Other advantageous embodiments of the procedure of the invention are characterized by that which is stated in the claims following below.

The means implementing the procedure of the invention which has an image plane consisting of individual image forming points for producing a one-dimensional or multidimensional image based on contrast discrimination, is mainly characterized in that the means comprises one image forming channel for each image forming point, said channels comprising signal frequency converters for the pick-ups at said points, composed of two-stage electric charge pumps, where the first stage is the image forming point current signal former, and the second stage is a frequency oscillator of which the frequency can be changed by said current signal, and of a tap between the stages, or an interaction point, to which the tapping point of one or several other converters has been connected over an appropriate impedance for forming an interaction network, and that the means comprises an interpreter part for interpreting the image consisting of frequencies produced by the channels.

The electric charge pump is in this connection understood to mean the periodic charging of a capacitance in the frequency oscillator of the converter with an external, constant frequency voltage, the current caused by this voltage in the second stage of said voltage being influenced by the image signal of the first stage, and the pace at which said capacitance is being charged determining the output frequency of the converter.

Other advantageous embodiments of the means of the invention are characterized by that which is stated in the claims following below.

The basic principles of the invention, for instance those applied in forming the capacitive image, are described in the following more in detail, referring to the drawings attached, wherein:

BRIEF DESCRIPTION OF DRAWING

FIGS. 7a and 7b show various forms of adaptation.

FIG. 8 presents the means applying the procedure of the invention, at block diagram level, FIG. 10 presents the sensitivity curve of the means of FIG. 9, due to different weighting of the image forming points, in the plane of the door opening, FIG. 11 shows the output signals of the means of FIG. 9.

DESCRIPTION OF THE PRINCIPLE OF THE INVENTION

The basic design of the invention can be defined as a two-stage system with inputs and outputs related to each other in a certain way. By employing practical quantities such as current, voltage and frequency in connection with the inputs and outputs, the definition of the system can be concretized as in FIG. 1.

The input quantity is the current $i_o$, and the output quantity is the frequency $f_1$. The tap is placed at the point where the current $i_1$ is introduced and which has the voltage $U_1$. The two-stage operation is realized as shown by the formulae inscribed in the block in the way that the input quantity $i_o$ effects directly only the tap point voltage $U_1$ if the current $i_1$ is constant. The output $f_1$ is directly proportional to the current $i_1$ (with the coefficient $k_1$). When the tap is connected by an impedance either to a fixed voltage level or to the taps of circuits operating in parallel, interaction is produced between the voltage $U_1$ and the current $i_1$, by which the current $i_1$, and hence the output frequency $f_1$, will change.

Figure 1:
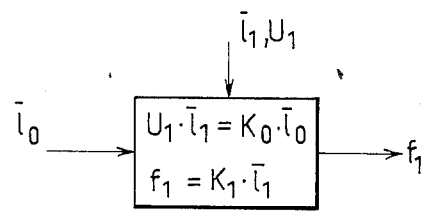
FIG. 1 presents the principle of operation of the basic unit of the means implementing the procedure of the invention.
Figure 2:
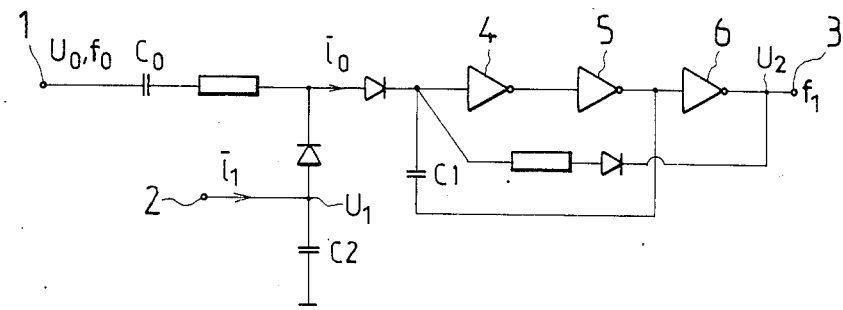
FIG. 2 shows the circuit diagram of the basic unit of the invention.

The circuit implementing the formulae given in FIG. 1 is presented in FIG. 2. An important feature of the circuit is a suitably selected tapping point, by the aid of which the features of the basic circuit can be modified by the mutual interaction of the circuits operating in parallel in the way that a plurality of practical applications, which may be based on the interaction of a number of signals, find a simple solution.

Figure 3:
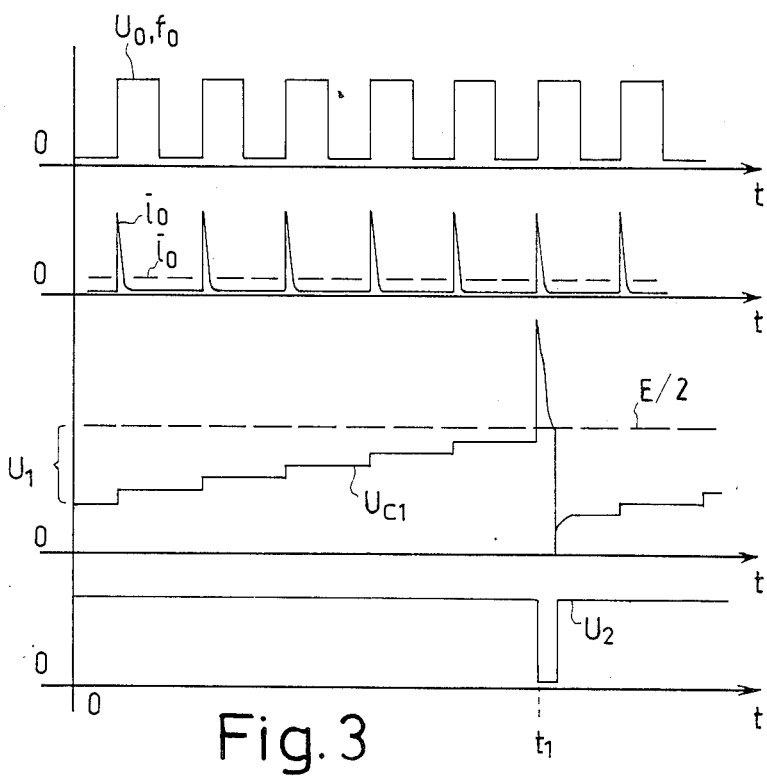
FIG. 3 illustrates the propagation of a signal in the basic unit.

The operation of the circuit depicted in FIG. 2 can be described in the following way, neglecting the diode threshold voltages and assuming that $U_o \gg U_1$ (see FIG. 3):

The voltage supply of the CMOS circuits 4,5,6 (e.g. of NOT type) is E, and the decision threshold of the circuit is assumed to be E/2. The voltage $U_1$ is then the differential voltage between the decision threshold and the capacitor C2.

By the aid of the capacitor C2, electric charge is pumped at frequency $f_o$ from the capacitor C2 to the capacitor C1. This produces a current, the average of which is $i_o$. If $U_o \gg U_1$, we find $$i_o = C_o * U_o * f_o \tag{1}$$

The voltage of capacitor C1 is at the beginning of the cycle by the amount of $U_1$ below the decision threshold E/2. With the current $i_o$, the capacitor C1 is filled up to the decision threshold in the time $$t_1 = (C1 * U_1)/i_o \tag{2}$$

After the time $t_1$ has passed, C1 is discharged by the aid of the CMOS circuits, delivering the charge $$Q = C1 * E \tag{3}$$

whereafter it is once again charged through the diodes to a level which is below the decision threshold by the amount $U_1$, thus starting a new cycle. In this manner, pulses are produced which have the frequency $f_1 = 1/t_1$.

The current that has been removed is (from equation 3):

$$Q_1/t_1 = (C1*E)/t_1 = i_1 \text{ (at equilibrium)} \tag{4}$$

Hence, $$f_1 = i_1/(C1*E) = k_1 * i_1; \; k_1 = 1/(C1*E) \tag{5}$$

that is, one of the two conditions for the block of FIG. 1 has been found. From equations (2) and (5) we find $$f_1 = 1/t_1 = i_o/(C1*U_1) = i_1/(C1*E),$$

with $$U_1 * i_1 = E * i_o = k_o * i_o; \; k_o = E$$

that is, the other condition.

Since exact satisfying of the conditions of the function blocks requires that no current is introduced in the circuit through the input, the input quantity $i_o$ has been generated by the aid of the capacitor pump. We may then according to equation (1) as the actual input quantity consider $C_o$, $U_o$ or $f_o$ if the other two quantities are kept constant. In the example application, voltage and frequency are constant, and capacitance is the variable input quantity, whereas when using pick-ups of other types the output quantity of the pick-up can be converted e.g. into a frequency, applying a technology known in the art. In the example application, the current $i_o$ will according to equation (1) remain dependent on the capacitance only:

$$i_o = k_2 * C_o \tag{6}$$

By connecting with each other the various taps of the basic circuits of FIG. 2 by different impedances and by arranging suitable current supply points in the impedance or interaction network, a circuit carrying out the pre-processing of the functional image information is obtained, which at the same time serves as analog/digital converter because the output is a frequency, which is directly appropriate to be processed digitally.

Figure 4:
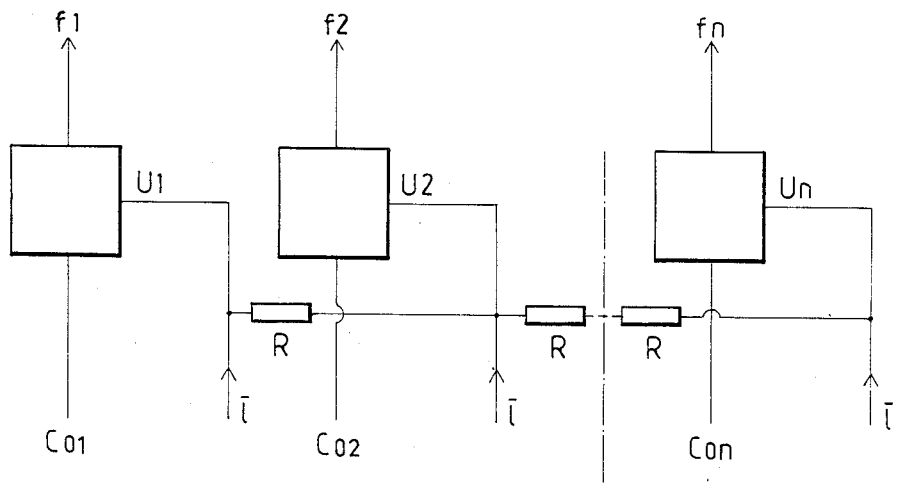
FIG. 4 presents the principle of connecting together a plurality of basic units.

In FIG. 4 is presented the pre-processing circuit for a one-dimensional capacitance image, at block level. To the tapping points of the different blocks, the constant current i is supplied, and the points are connected with each other e.g. by a resistor R. The distribution of the constant currents i between different channels is partly dependent on the voltages U1 ... Un. The frequency of the output f1 ... fn of each channel reflects the capacitances C01 ... C0n of the input pattern in the way that the frequency image that is obtained is principally proportional to the second derivate of the respective capacitance image.

Figure 5:
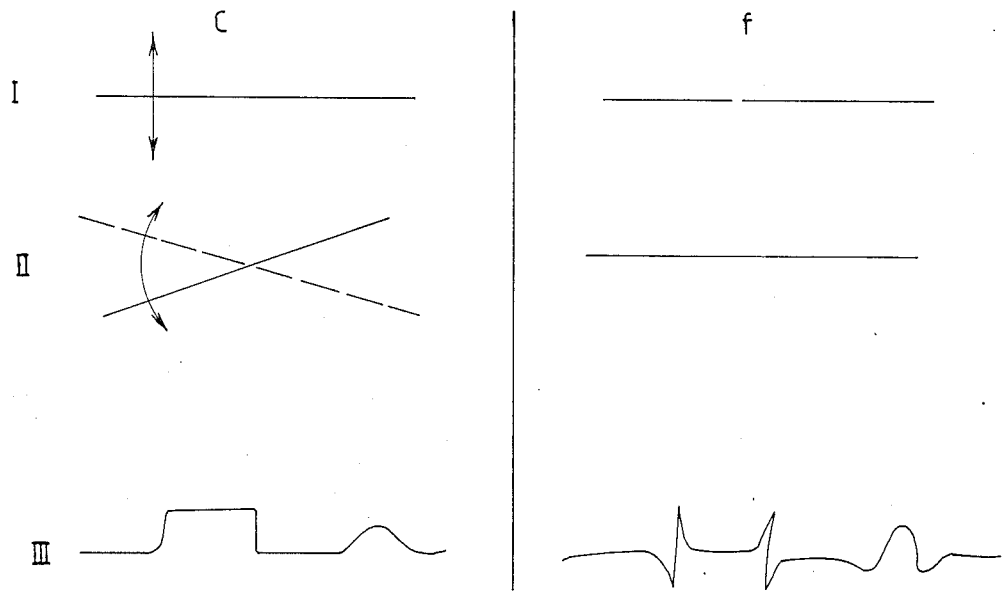
FIG. 5 illustrates the contrast heightening as taught by the invention, on principle level.

In FIG. 5 this matter has been illustrated. In Part I is shown a case in which the level of the C pattern changes. This causes no changes in the corresponding f pattern. The change of the derivate (slope) of the C pattern, taking place in Part II, also has no effect on the f pattern. Only when the derivate of the C pattern 2 changes—Part III—this will cause the addition to the f pattern of frequency components proportional to this derivate.

Figure 6A:
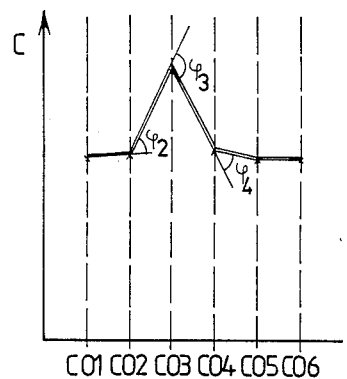
FIGS. 6a to 6f illustrate the contrast heightening in different phases, at apparatus level.

In FIGS. 6a–6f have been presented the steps in processing the image signal in a means comprising six capacitive antennas disposed to be the image forming points of a one-dimensional image. It is seen in FIG. 6a how the antennas see an object that has appeared adjacent to the third antenna: the capacitance C03 of the third antenna increases while the values of the other antennas stay substantially unchanged. If we imagine lines entered between the capacitance values of the antennas, we get a capacitive image in which the angular changes between the points contain the information which is essential from the point of view of the means of the invention.

Figure 6B:
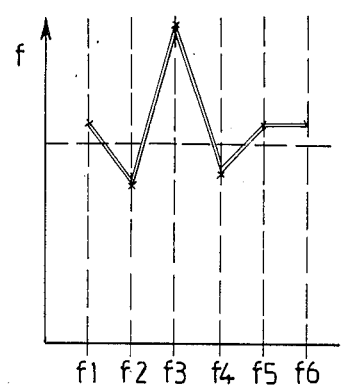

In FIG. 6b, the changes of the capacitances have been allowed to be reflected in the output frequencies f1–f6 of the capacitance/frequancy converters of FIG. 2, the corresponding frequency image resulting therefrom. It is seen that the angular changes have increased compared with the capacitance image, that is, the contrast has been heightened. This feature is produced by the aid of the interaction network.

Figure 6C:
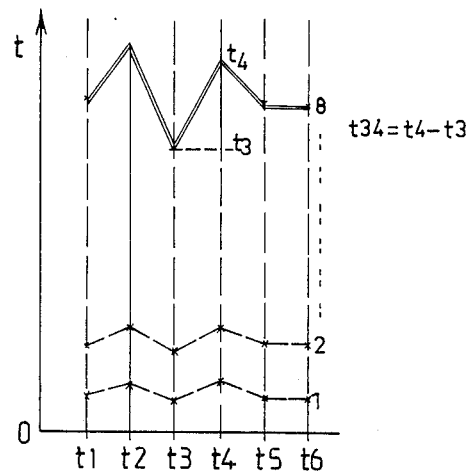

In FIG. 6c, the after-processing phase of the example means has been reached, in which the frequency image f1–f6 that has been produced is converted into time differences between the image forming channels by measuring in synchronized manner the frequency image components on the basis of the passage time differences of a given predetermined number of pulses, in the present instance eight pulses. At the same time, frequency/time conversion takes place.

Figure 6D:
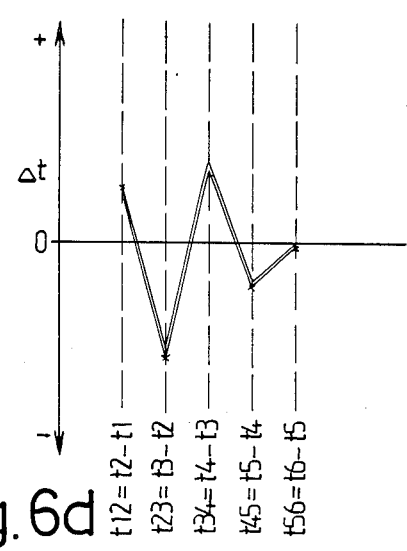

In FIG. 6d is shown how the time image obtained in the measuring phase has been converted by subtracting from each other the time quantities of mutually adjacent points t1–t6, this process resulting in five time difference quantities t12,t23,t34,t45 and t56. A procedure of this kind also contributes to higher contrast.

Figure 6E:
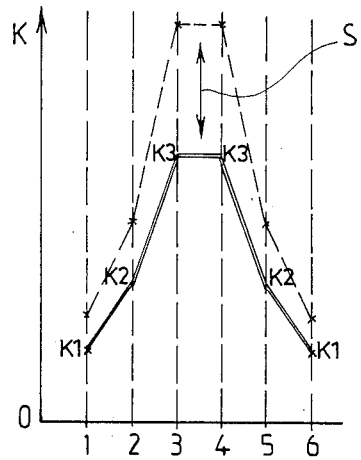

In FIG. 6e, one mode of weighting of the channels is presented, lower weighting factors (K1,K2) having been assigned to the "marginal channels" compared with the image forming points located in the centre of the image field (K3). This is frequently advantageous for the reason that the background factors in the marginal areas may, owing to discontinuity, deviate strongly from the central area of the image, while at the same time they are less significant from the point of view of operation, and therefore decreasing their weighting factor will result in more reliable operation of the means. The weighting factors are often fixedly set by component selection and component connections, while on the other hand the sensitivity adjustment S must be easy to accomplish, in order to optimize the operation.

Figure 6F:
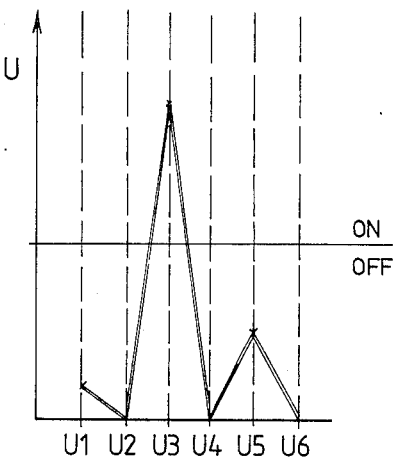

FIG. 6f presents the ultimate image in our example of capacitive image processing. In the example, the object that has appeared in the adjacency of the third antenna produces in the voltage image a voltage U3 which surpasses the decision threshold and thereby forwards indication of the presence of the object. The voltages are produced by integrating, with reference to the digital signal indicating the termination of counting performed on the frequency f1–f6 of each channel, the time interval from the end of the counting on its frequency to that taking place in the next channel on a lower frequency, and that when the voltage of any one channel obtained in this manner by integrating exceeds the decision threshold, an indication of the appearance of the object in the image field is forwarded.

FIGS. 7a and 7b aim to illustrate the adaptivity feature. If, as above, an object appears in front of the antenna No. 3, the result is a frequency curve as plotted in solid lines in FIG. 7a. Normally, the smooth curve has been disturbed by a frequency modification corresponding to the extra capacitance which the object represents, as has been described in the foregoing. If the object which caused the disturbance remains in the image field for some time, the profile of the curve starts to flatten in the way plotted with dotted lines in FIG. 7a, until the curve is once more a horizontal line. This phenomenon is due to the fact that in the interaction network the connection from the image forming channel to the other channels has been established by means of capacitors, whereby the extra current from the neighbouring channels caused locally by a high antenna capacitance will not continue after the current-producing voltage differences between the interaction points have gone over to the capacitors. Finally, the result in the case of the curve undergoing adaptation is a smooth frequency image, even if the object which caused the disturbance should still exist in the viewed object.

By adaptation, the effect of slowly changing background disturbances can be reduced. If the object is removed after the adaptation has taken place, a "hole" corresponding to the object remains in the image field seen by the antennas, the result thus being a "negative" frequency image in which the disturbance constitutes a local minimum of equivalent size. This is useful, for instance, in the lift safety edge to be described later on, as the door will not close at once after an obstacle that has kept the door open for a prolonged time.

FIG. 7b presents a non-adaptive component which is proportional to the capacitance value derived from the image forming points. This component appears and disappears immediately with the object that caused the disturbance. In addition, the relative effect of said component on the ultimate frequency image has in this case been adjusted to be less than that of the adapting component, whereby only sizable disturbances produce a significant non-adapting component. This component is useful for the reason that if for instance in the case of a lift a person keeps the door open, it is necessary that the door monitoring system is aware of the person being still in the door opening, as otherwise the door would close when the disturbance caused by the person has ultimately faded due to adaptation.

In FIG. 8, a capacitive safety edge to be installed on the lift doors is concerned, the ultimate function of which is to indicate whether there is an obstacle in the door opening or not when the door closes. Currently, said function is implemented by mechanical "collision strips", by photocells or, for instance, by capacitive, independently operating or differentially operating sensors.

It is one of the physical fundamentals of capacitance sensing that the basic capacitance of the pick-up is exclusively dependent on the area and shape of the antenna. The other capacitances that have to be taken into account in practical antenna constructions are the basic capacitance of the circuit, the antenna protection plate capacitances and the disturbance capacitances.

A protection plate placed on one side of the antenna plate reduces the effective area of the antenna approximately to one-half and prevents the antenna from seeing capacitances in the door structure, whereby the basic capacitance of the antenna is reduced and its sensitivity improves. The adaptation, voltage protection and placement features comprised in the means of the invention also contribute to higher sensitivity achievable in practice.

If the door of a lift consists of two halves moving towards each other, it is necessary to have one safety edge 7 with image processing means 8 for each side. If the door opens altogether on one side, one safety edge is enough. Other equipment entities of the system are a control means 9 and a power source 10. The voltage supply points of the image processing means 8 oscillate in joint form with reference to the grounded level, e.g. at 30 kHz frequency and at 50 V amplitude (U12 and U22), by which oscillation the pumping effect of electric charges of the invention is accomplished with the antenna capacitances. The voltages of the connection points of the circuits 8 have been indicated by U11 and U12, of which more below, as well as concerning the outputs 11 and 12 of the control means 9.

Figure 9:
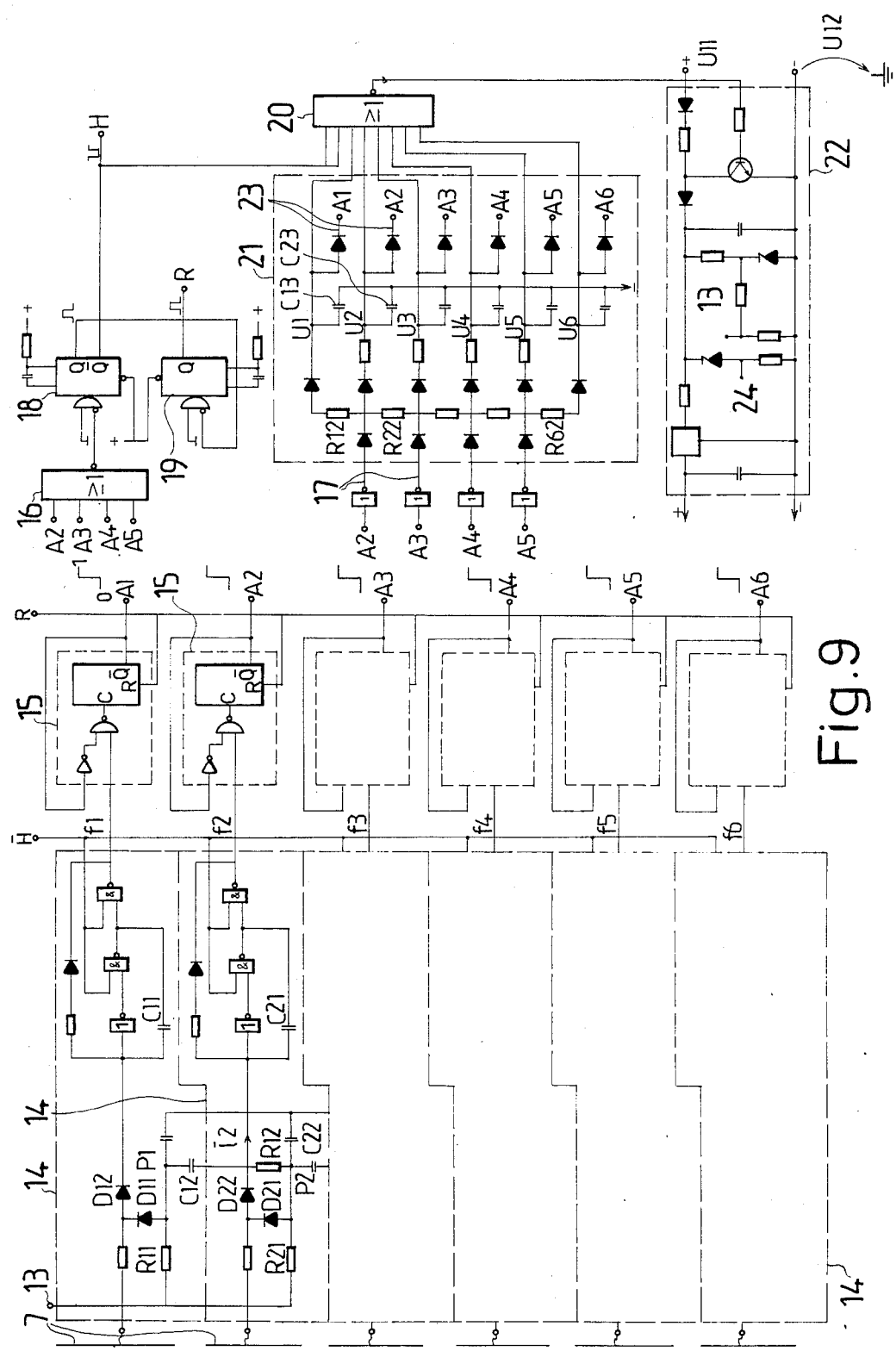
FIG. 9 shows the block 8 of FIG. 8, at circuit diagram level.

In FIG. 9 has been presented one circuit diagram of the image processing means 8 of FIG. 8 with its capacitive antennas 7. Let us consider the phases in processing in the means the image signal produced in the second channel from the top in the figure. It is assumed that the antenna has just registered that an object has appeared in its image field, by registering a disturbance capacitance.

The circuit block 14, which corresponds to the circuit of FIG. 2, acts as a "pump", which induces a certain immunity towards electrical interference. In practical applications, this is of great importance since no special interference shielding is required and little attention need be paid to freedom of disturbances of the zero level. The energy needed for the pumping is obtained from the voltage U12, which is a 50 V d.c. voltage pulsed at 30 kHz frequency. From the voltage pulses, a current i2 passes through the diode D22, and this current "pumps" charge into the capacitor C21.

When the antenna capacitance increases due to a disturbance capacitance, the current i2 increases in direct proportion thereto, according to formula (1). The voltage corresponding to the voltage $U_1$ of the interaction point P2 in FIG. 2, which was determined to be the voltage between the operating point of the circuit and the interaction point, increases correspondingly. Hereby, the capacitors C22 and C12 supply an extra current component to the channel that was disturbed, for attaining a new voltage at rest at the interaction point P2. This extra current supplied to the "disturbance channel" is felt not only in the discharging frequency of the capacitor C21 of this channel but also in the adjacent channels as a corresponding loss of energy at their interaction points, resulting in a "negative" reaction in comparison with the disturbed channel. This effect can be compared e.g. with the "lateral inhibition" observed in biological nerve systems, leading to heightening of contrast.

After the new equilibrium voltage of the interaction point P2 has been reached, the flow of current ceases between channels in the interaction network. Simultaneously, the effect of the disturbance capacitance ends. The disturbance has now become adapted to blend with the background image seen by the antenna. If however a significant disturbance is concerned, which in the present instance would be at least a human hand in the immediate proximity of the antenna, the increase of $U_1$ causes a small current increase across the resistor R21. The respective resistors of this and the other channels have been connected to a constant voltage on the terminal 13. The current component obtained from the constant voltage source over the resistor R21 does not adapt but flows as long as the voltage $U_1$ of the interaction point P2 is unchanged. By this extra component of the current $i_1$ of FIG. 2, the non-adaptive feature is produced.

All said current components influence the discharging frequency of the capacitor C21 through the current i2, said frequency constituting the frequency component f2 of the channel in question. The frequency is counted by samples of eight pulses, synchronously, with octal counters 15, the time differences emerging from the count being interpreted as was described in connection with FIGS. 6c and 6d.

Immediately after the fastest channel (in the present instance that which has the output A2) has counted its eight pulses, the digital signal A2 indicating termination of count begins to exert influence on the inverter circuit operating at an adjustable voltage level and which supplies current to the integration input 17 of the frequency/voltage converter 21, whereby the voltage U2 equivalent to the relative frequency of the channel with reference to the other channels begins to build up across the capacitor C23.

The values of the capacitors C13–C63 in combination with the resistors R12–R62 serve at the same time through their RC time constants as another weighting facility for differentiating the sensitivity of the channels.

When eight pulses of the channel outputs A2–A5 have been counted, all counters 15 have pulled their output up, which is observed by the down-pull of the output of the gate 16. This signals the pulse forming circuit 18 to deliver a pulse H synchronizing the reading moment, to the disturbance detection gate 20. The same pulse also opens the outputs of the image forming circuits 14 of the invention to start a new frequency counting cycle. The pulse forming circuit 18 also gives a command to the tumbler 19 to set the counters 15 to zero by a zeroing pulse R.

In a normal case with no disturbance, all inputs of the disturbance detector 20 are thus at logical zero at the moment of reading, whereby the NAND gate 20 delivers a pulse to the transistor T1 in the output stage 22, which in turn by pulsing the voltage U11 informs the control means (FIG. 8, reference numeral 9) that there is no disturbance.

In the present instance, the voltage U2 surpasses the decision threshold at the moment when a pulse H arrives at the disturbance detector 20, which has the effect that no pulse is forthcoming from the NAND gate 20. Therefore the pulse of the output stage 22 also fails t be formed.

In FIG. 10 has been depicted the coverage constituted by a safety edge with six antennas, the image forming channels having been weighted in the manner presented in the foregoing. The highest sensitivity has been arranged to occur at the image forming points located in the centre of the image field, for which points the maximum sensing distance a can be made by means of the present invention, even in adverse conditions (e.g. an unstably moving closely positioned shaft door), depending on the antenna design, to be up to 100 mm.

Finally, in FIG. 11 is presented the voltage U11 between the connection points of the block 22 containing the output stage, and voltage stabilizing circuits, in various situations; the functions caused by its output pulses in the control means 9 of FIG. 8; and typical voltage and frequency values. The voltage U11 is adjustable in the range 16–22 V, by which adjustment the voltage level at the point 24 is affected, which supplies the inverting circuits controlling the integration inputs 17. The changeable voltage level affects the disturbance detection sensitivity in the manner illustrated by FIG. 6e. In the normal operating mode N, when the lift door is open, pulses indicating the end of the measuring cycle and freedom from disturbances in the door opening occur at frequency 120–150 Hz. When the lift doors close, the capacitance of the antennas increases strongly in the region DC so that the frequency of the pulses increases to 160-300 Hz. In a disturbed situation D, the pulses cease, as was described above, and the absence of at least two consecutive pulses is interpreted in the control to be a disturbance requiring opening of the doors.

When a disturbance occurs in the region D, the control means 9 of FIG. 8 pulls its output 11 down after a delay equivalent to about two missing pulses. The line returns to state 1 after the disturbance has ceased to act.

When the doors close, the pulse frequency increases, whereby after a certain delay the control means renders the safety edge inactive by pulling down the output 12. This must be done because when the antenna capacitances increase strongly, various disturbances of operation, difficult to predict, may occur. Since the safety edges are not needed while the doors are closed, they can most appropriately be made inactive. In this case the line S merely indicates that the safety edges are indeed out of action. Here too, the invention affords the advantage that the means distinguishes between the increase of the overall capacitance due to closing the doors and a disturbance capacitance due to an obstacle in the door opening, whereby this function, too, becomes reliable. The safety edge is again made active after the doors open, with a certain delay.

If the disturbance is on for longer than 20 seconds, or if the summed disturbance detection time exceeds this same value, the error checking circuit FS is switched on and it pulls the line 12 down. By the aid of this output, the unit controlling the operation of the door is informed that the safety edge is not functional, and it is then possible to switch on e.g. a photocell to be the door-opening means.

Thereafter, if there has been no obstacle or the obstacle has gone away, the doors are closed, and a check is made to ascertain whether the line S has gone up. If it has, the safety edge is most probably in order, and transition is made to the normal mode of operation, to checking the pulses of U11. If the image forming means is defective, it is most unlikely that the safety edge cutout detector (the line S) is operative, and the safety edge then remains subjugated to the error checking circuit FS. The error checking circuit may consist of a fully previously known, simple logic circuit; therefore, it will not be presented in any greater detail.

It is obvious to a person skilled in the art that different embodiments of the invention are not exclusively confined to the example presented in the foregoing but may vary within the scope of the claims presented below. For instance, the image forming may be implemented by means of any pick-ups or components suitable for image forming, such as phototransistors, photodiodes, photoresistors, etc. when the output signal produced by the pick-up is converted e.g. into frequency. It is also possible, applying existing techniques, to log-modulate the signal if its range of variation is very wide, before supplying it to the contrast image forming means of the invention. The contrast image formed by the aid of image point-specific frequencies may also be after-processed in a number of ways, e.g. for shape-identifying applications.

I claim:

1. A procedure for producing an image based on contrast discrimination in an image forming means of at least one-dimensional image filed with discrete picture elements, comprising:

detecting an image signal for each said picture element to produce an output thereof:

applying a first electric current to an image forming channel having a tapping point with a voltage, said first current affecting a second current, having an output frequency, flowing into said tapping point of said image forming channel;

connecting said tapping point to corresponding tapping points of other image forming channels and simultaneously affecting said voltage of said tapping point, in such a manner that the product of said second current value and said voltage value is proportional to said first current value, and wherein the output related to said picture element has an output frequency proportional to the output frequency of said second current;

supplying a suitable current to an interaction network connecting, by means of suitably selected impedances, said tapping point of said image forming channel to the tapping points of the image forming channels of other picture elements, such that a desired contrast heightening of the image is achieved and such that said output frequency of each said image forming channel combine to form a frequency image, which becomes the basic information for interpretation of the image by digital means.

2. A procedure according to claim 1, wherein to each tapping point of an image forming channel is supplied a constant current, which produces a constant basic frequency component in the output frequency referred to as frequency image.

3. A procedure according to claim 1, wherein to said tapping points of the image forming channels is connected a resistor, one end of which has been connected to a suitably selected voltage level, by which a frequency component proportional to the absolute value of the image signals is produced.

4. A procedure according to claim 1, wherein said frequency image which was produced is converted into time differences between said image forming channels by measuring synchronously the frequency image components on the basis of the passage time differences of a given pre-selected number of pulses, and that conclusions concerning the changes occurring in the object that is being viewed are drawn by integrating, with reference to the time of the digital signal indicating termination of said pulses, said termination of said pulses being decided by performing a pulse counting on a second frequency of each said image forming channel, and that when the counting performed on the frequency of each channel, the time interval from termination of counting at its frequency to that taking place at lower frequency in an adjacent channel, and that when the signal, thus integrated, of any channel surpasses a decision threshold, indication is given of the appearance of an object in the image field.

5. A procedure according to claim 1, wherein the image forming points located in different parts of the image field are weighted differently for achieving desired sensitivity distribution of the image forming points.

6. A procedure according to claim 1, wherein at the image forming points capacitive antennas are used for producing a contrast image, said antennas identifying changes of capacitance in the environment and forming image signals thereof.

7. A procedure according to claim 1, wherein said impedances connecting the interaction network are series-connected resistor-capacitor impedances between the tapping point of the image forming channel of one picture element and the tapping points of the image forming channels of neighboring picture elements, with which is formed a component of said frequency image which is basically proportional to a first change in the slope of the image defined by the signal values of the picture elements in spatial coordinates at a point corresponding to said image forming channel, and which frequency component after a second change in the signal values caused by the viewed object, in the course of a time interval determined by the magnitude of said second change, adapts to the new signal values, thereby eventually contributing to a smooth image.

8. A procedure of controlling the safety edge of a lift and the like having at least one door opening and a control system comprising the steps of:

employing an image forming system that operates based on contrast discrimination, in an image forming means of unidimensional image field with discrete picture elements, wherein the image signal related to one picture element produces a first electric current in an image forming channel, designated a tapping point, said first current affecting a second current flowing into said tapping point of said image forming channel, said tapping point being connected to corresponding points of other image forming channels, and simultaneously affecting a voltage established at said tapping point, in the manner that the product of the second current multiplied by said voltage is proportional to the first current, and wherein the output related to said picture element is a frequency proportional to the second current, and wherein the interaction between the image forming channels to obtain the desired contrast heightening of the image is accomplished by supplying a suitable current to an interaction network connecting the tapping point of said image forming channel to the tapping points of identical image forming channels of the other picture elements, by means of suitably selected impedances, and that the frequencies obtained from each image forming channel is the basic information for the interpretation of the image by digital means;

mounting said image forming system having said image forming channels vertically and at least on one side of said door opening of said lift; and monitoring the entrance of people and objects in the opening of said door opening using said image forming system, wherein when said image forming system concludes that an obstacle has entered between said door opening of said lift said image forming channels informs thereof said control system of said lift.

9. A procedure according to claim 8, wherein the image forming means monitors the operation of said door opening of said lift by independently monitoring the absolute values of the capacitances caused by the detection of the object, for a period of time, by at least one array of antennas in said door opening, and in said period of time that said object is being detected, the safety edge being made inactive when the doors are closed, whereby the capacitance is distinctly greater than when the door is open, and when said period of time that said object is being detected surpasses a predetermined limit.

10. An image forming system for controlling the safety edge of a lift and the like, comprising:

means for constituting an image field comprising a plurality of image forming points for producing an image of at least one dimension based on contrast discrimination;

a plurality of image forming channel means each associated with one of said image forming points, said image forming channel means comprising a signal/frequency converter for pick-ups at corresponding image forming points, said signal/frequency converter having two-stage electric charge pumps including a first stage for producing a first current based on an input to said image forming points and a second stage for producing a frequency oscillation having a frequency which is a function of said first current;

means for providing a tapping point for said image forming channels to which an interaction between said image forming channels is provided to form an interaction network, and including impedance means for controlling said interaction; and means for interpreting an image produced by said image forming system to control opening and closure of said safety edge of said lift.

11. An image forming means according to claim 10, wherein from the frequency image that has been produced can, by the aid of the interaction network, be separated an image component proportional to changes in the steepness of the waveform representing the contrast differences in said image field, said component being maintained by a capacitance connected between interaction points of each said image forming channel, and which therefore in the case of permanent changes is adpated out of the image within a certain period of time.

12. An image forming means according to claim 10, wherein from the frequency image obtained can be separated a permanent image component proportional to the magnitude of the changes in the said contrast waveform, which is formed of the changes caused by a second current proportional to the image current signal, where said second current flows through a resistor to produce a non-volatile voltage that at each moment represents said permanent image component.

13. An image forming means according to claim 10, wherein the outputs of the signal/frequency converters have been connected to pulse counters, by the aid of which the frequency/time conversion can be carried out by synchronized pulse counting in the channels, and wherein the digital voltage signal that indicates at each said image forming channel the termination of the counting of a pre-selected number of pulses of the frequency signal of each channel is connected to an analog time/voltage converter, and which signal can be integrated with reference to time during a period equivalent to the time interval between the termination of pulse counting in a first channel to the corresponding termination of counting at a lower frequency in an adjacent second channel, in order to produce a voltage image proportional to the current signals induced by the viewed object in said image forming channels.

14. An image forming means according to claim 13, wherein the analog time/voltage converter circuit contains RC time constant circuits by which the signals obtained from different image forming channels can be assigned different weights.

15. An image forming means according to claim 10, wherein said image forming points are capacitive antennas by the aid of which the capacitive changes in the environment are identifiable.

16. An image forming means according to claim 15, wherein the safety edge of a lift is composed of a one-dimensional image forming system in the way that at least on one side of the door opening of the lift are placed capacitive antennas in vertical sequence and by the aid of which the arrival of people and objects at the lift door can be monitored and information hereof forwarded.

* * * * *